US009161239B2

(12) United States Patent
Mercier (10) Patent No.: US 9,161,239 B2
(45) Date of Patent: Oct. 13, 2015

(54) NETWORK ACCESS POINT MANAGEMENT

(75) Inventor: Mathleu Mercier, Laval (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 224 days.

(21) Appl. No.: 13/080,898

(22) Filed: Apr. 6, 2011

(65) Prior Publication Data

US 2012/0257603 A1 Oct. 11, 2012

(51) Int. Cl.
*H04W 4/00* (2009.01)
*H04W 24/02* (2009.01)
*H04W 88/08* (2009.01)

(52) U.S. Cl.
CPC .............. *H04W 24/02* (2013.01); *H04W 88/08* (2013.01)

(58) Field of Classification Search
USPC ......................................................... 370/338
See application file for complete search history.

(56) References Cited

U.S. PATENT DOCUMENTS

| | | | |
|---|---|---|---|
| 7,764,699 B2 | 7/2010 | Jennings et al. | |
| 8,194,560 B2* | 6/2012 | Ji et al. | 370/252 |
| 2002/0196749 A1 | 12/2002 | Eyuboglu et al. | |
| 2002/0196763 A1* | 12/2002 | Reynolds et al. | 370/338 |
| 2003/0018732 A1* | 1/2003 | Jacobs et al. | 709/208 |
| 2005/0144299 A1* | 6/2005 | Blevins et al. | 709/230 |
| 2005/0276237 A1* | 12/2005 | Segal et al. | 370/312 |
| 2006/0089127 A1* | 4/2006 | Muratsu | 455/411 |
| 2007/0079362 A1* | 4/2007 | Lortz et al. | 726/5 |
| 2007/0239719 A1* | 10/2007 | Cotner et al. | 707/8 |
| 2007/0297421 A1* | 12/2007 | Huseth | 370/400 |
| 2008/0049691 A1* | 2/2008 | Pulikonda | 370/338 |
| 2008/0052433 A1* | 2/2008 | Harima et al. | 710/104 |
| 2008/0091862 A1* | 4/2008 | Hiraka | 710/110 |
| 2008/0180397 A1* | 7/2008 | Sakurai et al. | 345/163 |
| 2009/0028118 A1* | 1/2009 | Gray et al. | 370/338 |
| 2009/0055541 A1 | 2/2009 | Sato et al. | |
| 2009/0094680 A1* | 4/2009 | Gupta et al. | 726/3 |
| 2009/0132675 A1* | 5/2009 | Horn et al. | 709/207 |
| 2009/0135784 A1* | 5/2009 | Horn et al. | 370/331 |
| 2009/0239508 A1* | 9/2009 | Waddell | 455/414.1 |

(Continued)

FOREIGN PATENT DOCUMENTS

WO 2008052004 A1 5/2008

OTHER PUBLICATIONS

RFC 5416, Calhoun et al., Control and Provisioning of Wireless Access Points (CAPWAP) Protocol Binding for IEEE 802.11, Network Working Group Request for Comments: 5416 Category: Standards Track, Aruba Networks, Mar. 2009.*

(Continued)

*Primary Examiner* — Brian J Gillis
*Assistant Examiner* — Michael A Keller
(74) *Attorney, Agent, or Firm* — Van Cott, Bagley, Cornwall & McCarthy (57) ABSTRACT

Network access point management includes: connecting to a network access point with a first controller device implemented by at least one processor; transmitting an updated configuration for the network access point from the first controller device to the network access point; transmitting a new value for a configuration version value stored by the network access point to the network access point; and transmitting the new value for the configuration version value stored by the network access point from the first controller device to each controller device in a group of controller devices to which the first controller device belongs.

15 Claims, 7 Drawing Sheets

(56) References Cited

U.S. PATENT DOCUMENTS

| | | |
|---|---|---|
| 2009/0252059 A1* | 10/2009 | Vigue et al. .................... 370/254 |
| 2009/0253421 A1* | 10/2009 | Camp et al. .................... 455/418 |
| 2009/0318193 A1* | 12/2009 | Littlefield et al. ............ 455/561 |
| 2010/0106823 A1 | 4/2010 | Davis et al. |
| 2010/0257584 A1* | 10/2010 | Meenan et al. .................... 726/1 |
| 2010/0292818 A1* | 11/2010 | Ramsay ......................... 700/94 |
| 2010/0313262 A1* | 12/2010 | Mehta et al. .................... 726/12 |
| 2011/0007665 A1* | 1/2011 | Dinur ........................... 370/254 |
| 2011/0032883 A1* | 2/2011 | Patil et al. .................... 370/329 |
| 2011/0038372 A1* | 2/2011 | Wijayanathan et al. ...... 370/389 |
| 2011/0263274 A1* | 10/2011 | Fox et al. .................... 455/456.2 |
| 2012/0150796 A1* | 6/2012 | Martick ......................... 707/610 |
| 2012/0198435 A1* | 8/2012 | Dirstine et al. ................ 717/173 |
| 2012/0252429 A1* | 10/2012 | Yoshizawa .................... 455/418 |
| 2012/0257491 A1* | 10/2012 | Mongeau et al. ............. 370/216 |
| 2014/0153473 A1* | 6/2014 | Gundavelli et al. ........... 370/312 |

OTHER PUBLICATIONS

"WLAN Controller Failover for Lightweight Access Points Configuration Example"; http://www.cisco.com/en/US/tech/tk722/tk809/technologies_configuration_example09186a008064a294.shtml.

* cited by examiner

NETWORK ACCESS POINT MANAGEMENT

BACKGROUND

To provide access to a wireless network throughout a large area, such as a large building, organizations typically rely on the use of access points. Access points may be distributed throughout the area for which wireless network access is desired such that a client device within the area will generally be within range of one or more of the access points. Each access point provides a wireless interface to a wired network.

Like many network devices, a typical access point device has a number of configurable settings. The state of each setting affects the way the access point functions and/or how client entities or other network devices interface with the access point. For example, one setting of an access point may specify the channel on which the access point will communicate with client devices. Other settings may specify the type of encryption to be used in communicating with client devices, an encryption key to be used, and a Service Set Identifier (SSID) that identifies the network to which the access point provides access.

One of the benefits associated with the use of access points in an area is the ability of a client device to seamlessly transition between access points as the client device is moved to different locations within the area. However, to enable these seamless transitions between access points, it is generally desirable that the access points within the area be configured with the same settings.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses systems, methods, and computer program products for managing the configuration of network access points managed by a team of controller devices. In particular, the present specification provides a solution for ensuring that in a team of wireless access point controllers, each wireless access point controller is aware of the most recent configuration revision identifier that has been assigned to a given access point.

For example, the present specification discloses a method of network access point management, including: connecting to a network access point with a first controller device implemented by at least one processor; transmitting an updated configuration for the network access point from the first controller device to the network access point; transmitting a new value for a configuration version value stored by the network access point to the network access point; and transmitting the new value for the configuration version value stored by the network access point from the first controller device to each controller device in a group of controller devices to which the first controller device belongs.

Additionally, the present specification discloses a method of network access point management, including: in a second controller device implemented by at least one processor, receiving from a first controller device a configuration version value assigned to a network access point by the first controller device, the first controller device and the second controller device belonging to a group of controller devices; in response to the access point connecting to the second controller device, querying the network access point with the second controller device for a configuration version value stored by the network access point; receiving in the second controller device the configuration version value stored by the network access point from the network access point; and with the second controller device, allowing the network access point to immediately begin providing network access point services only if the configuration version value received from the network access point matches the configuration version value received from the first controller device.

The present specification further discloses a controller device, having a processor communicatively coupled to a memory. The memory stores executable code that, when executed by the processor, causes the processor to: connect to a network access point; transmit an updated configuration for the network access point to the network access point; transmit a new value for a configuration version value stored by the network access point to the network access point; and transmit the new value for the configuration version value stored by the network access point to a plurality of peer controller devices in a group to which the controller device belongs.

As used in the present specification and in the appended claims, the term "access point" refers to a device which allows wireless devices to connect to a wired network using Wi-Fi, Bluetooth, or any other relevant wireless standard.

As used in the present specification and in the appended claims, the term "client device" refers to an electronic device which connects to a wired network using an access point.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the example is included in at least that one example, but not necessarily in other examples.

Figure 1:
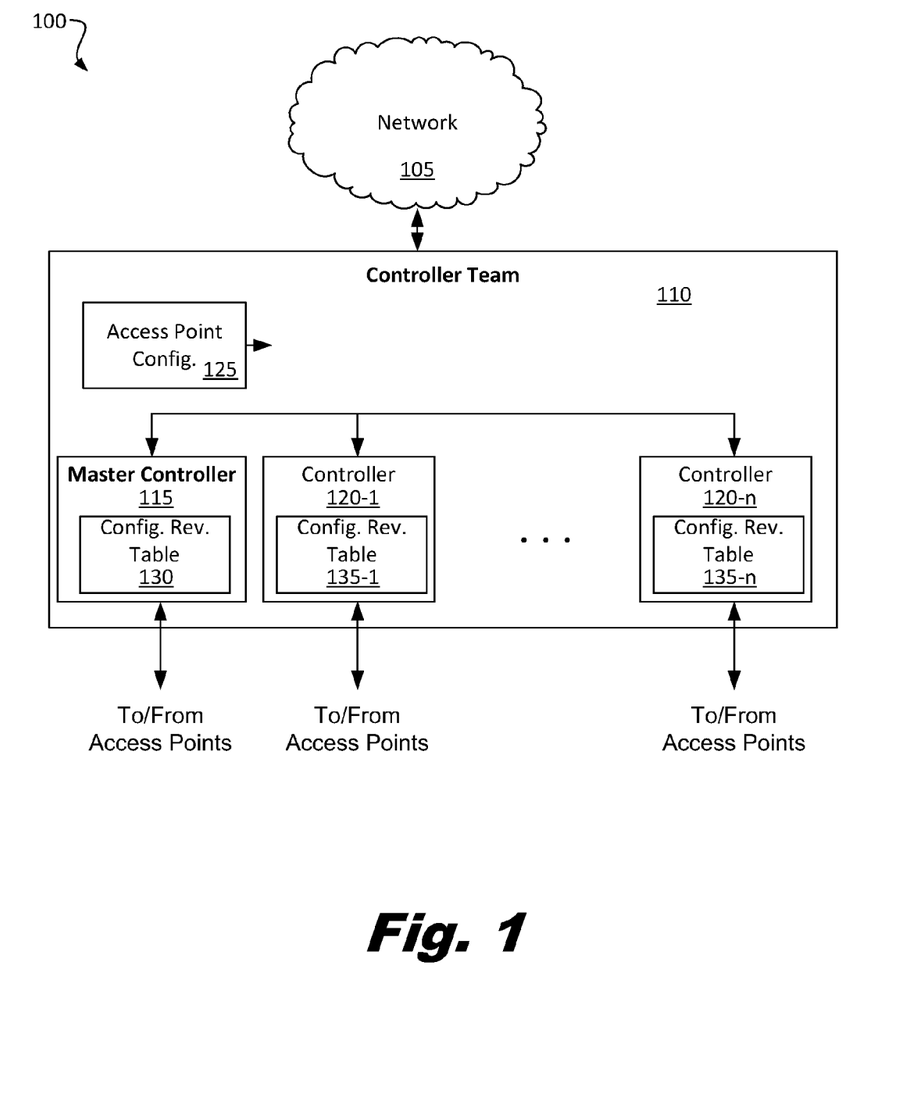
FIG. 1 is a block diagram of an illustrative system for allowing managing wireless access points, according to one example of principles described herein.

FIG. 1 shows a block diagram of an illustrative system (100) for managing wireless access points, according to one example of principles described herein. The system (100) includes a network (105) and a team (110) of access point controllers (115, 120-1 to 120-n). Each of the access point controllers (115, 120-1 to 120-n) can connect to and manage multiple wireless access points. For example, each access point controller (115, 120-1 to 120-*n*) may be capable of connecting to and managing up to 200 access points. Each access point controller (115, 120-1 to 120-*n*) may configure each of the access points that it manages. The configuration provided an access point controller (115, 120-1 to 120-*n*) to an access point may ensure that the access point complies with network policy. For example, the access point controller (115, 120-1 to 120-*n*) may configure each of its access points to broadcast the same SSID on a predetermined channel, and that each access point uses a predetermined type of encryption and encryption key(s) to connect with and authenticate client devices.

One of the access point controllers (115) may be designated the master controller (115). In addition to managing its own set of access points, the master controller (115) coordinates the exchange of information among all of the access point controllers (115, 120-1 to 120-*n*) in the team (110) in order to manage the uniform implementation of defined network policies. The access point controllers (115, 120-1 to 120-*n*) may communicate with each other using a tunneling protocol, such as Generic Routing Encapsulation (GRE), Virtual Private Network (VPN) tunneling, or any tunneling protocol that may suit a particular application of the principles described herein.

For instance, the master controller (115) may provide access point configurations (125) to each of the other access point controllers (120-1 to 120-*n*). These access point configurations may be used by the access point controllers (115, 120-1 to 120-*n*) to configure the access points that they manage. In this way, all access points managed by the controller team (110) may be configured to comply with policies set by a network administrator, thereby increasing network security and ensuring the portability of client devices between the access points.

As desired access point configurations are updated or otherwise modified by a network administrator, the network administrator may provide the updated configuration(s) to the master controller (115), which may then propagate the updated configuration(s) to the other access point controllers (120-1 to 120-*n*). Each of the controllers (115, 120-1 to 120-*n*) may then update the configuration of any of its applicable access points using the updated configuration(s) received from the master controller (115). The master controller (115) may receive the updated configuration(s) over the network (105) and/or directly from a network administrator.

Each access point managed by an access point controller (115, 120-1 to 120-*n*) may store a configuration version indicator. The configuration version indicator may initially have a default value that indicates a factory default configuration. Each time an access point controller (115, 120-1 to 120-*n*) updates the configuration of an access point, the access point controller (115, 120-1 to 120-*n*) may write a new value to configuration version indicator stored by the access point.

Each of the controllers (115, 120-1 to 120-*n*) may store a configuration revision table (130, 135-1 to 135-*n*). Each configuration revision table (130, 135-1 to 135-*n*) may store the most recent configuration version indicator assigned to each access point managed by the access point controller team (110). These configuration revision tables (130, 135-1 to 135-*n*) may be dynamically updated whenever the configuration of an access point is updated by an access point controller (115, 120-1 to 120-*n*) in the controller team (110).

As will be explained in more detail below, the use of these configuration revision tables (130, 135-1 to 135-*n*) may increase the operating efficiency of the access points managed by the access point controller team (110) by avoiding the delays and access point down-time associated with the unnecessary reconfiguration of access points that migrate between controllers (115, 120-1 to 120-*n*) in the access point controller team (110).

Figure 2:
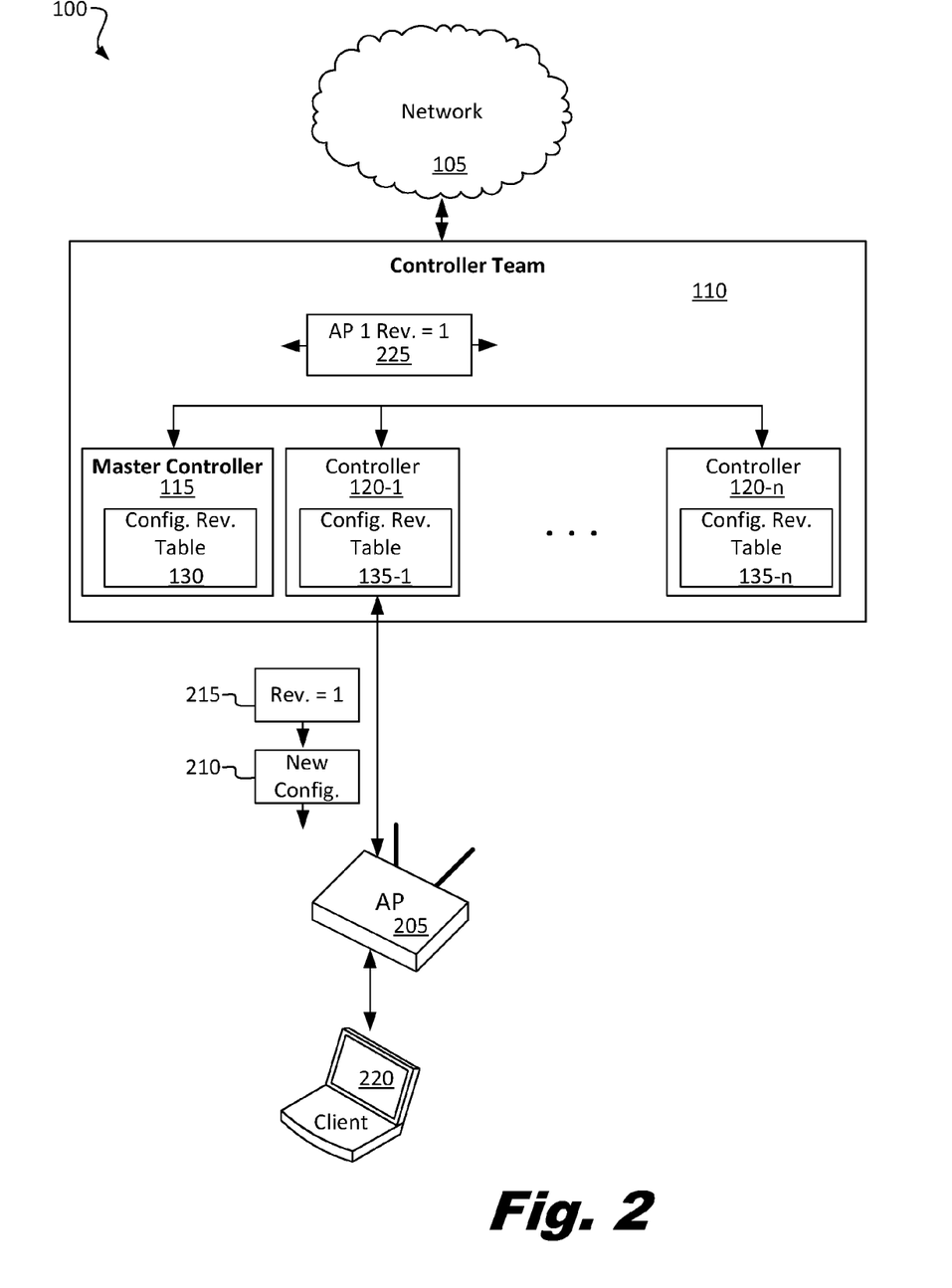
FIG. 2 is a block diagram of an illustrative system for allowing a client to access a network, according to one example of principles described herein.

FIG. 2 shows an illustrative process that may occur when an access point (205) first connects to a controller (120-1) in the access point controller team (110) of FIG. 1. Upon first connecting to a first access point controller (120-1) in the team (110), the first access point controller (120-1) may query the access point (205) for its current configuration version indicator. In the present example, the access point (205) may be a new access point with a factory default configuration. Hence, the access point (205) may respond to this initial query by transmitting a configuration version indicator corresponding to its factory default configuration.

After receiving the configuration version indicator from the access point (205), the first access point controller (120-1) may determine that a current configuration (125, FIG. 1) for that access point (205) has been previously received from the master controller (115). The first access point controller (120-1) may further determine that the current configuration (125, FIG. 1) previously received from the master controller (115) differs from the factory default configuration of the access point (205). Consequently, the first access point controller (120-1) may transmit a new configuration (210) to the access point (205), where the new configuration (210) brings the access point (205) into conformity with the configuration (125, FIG. 1) received by the first access point controller (120-1) for that particular access point (205).

In conjunction with the new configuration (210) transmitted to the access point (205), the first access point controller (120-1) may also transmit a new value (215) for the configuration version indicator stored by the access point (205). This new value (215) may overwrite the previous value of the configuration version indicator stored by the access point (205), and reflects that the configuration of the access point (205) has been updated.

Additionally, the first access point controller (120-1) may unicast a message (225) to each of the other access point controllers (115, 120-1 to 120-*n*) in the team (110). This message (225) may include at least an identifier of the access point (205), an identifier of the first access point controller (120-1), an amount of time that the first access point controller (120-1) has been connected to the access point (205), and the new value (215) of the configuration version indicator of the access point (205). Upon receiving this message (225), each of the other access point controllers (115, 120-1 to 120-*n*) may update its corresponding configuration revision table (130, 135-1 to 135-*n*) to record that the access point (205) has been configured by the first access point controller (120-1), and that the access point (205) has been assigned the new value (215) as its configuration version indicator.

Once the configuration of the access point (205) has been updated by the first access point controller (120-1) in this manner, the access point may be permitted to connect to client devices (220) and serve as a bridge between the client devices (220) and the network (105).

In addition to the initial configuration received from the first access point controller (120-1), the configuration of the access point (205) may be updated from time to time as updated configurations (125) that apply to the access point (205) are released by the master controller (115) to the remaining access point controllers (120-1 to 120-*n*) in the team (110). Each time the configuration of the access point (205) is updated, a new value may be written to the configuration version indicator of the access point (205), and a new message (225) may be transmitted to the access point controllers (115, 120-1 to 120-*n*) of the team (110) in order to ensure that each access point controller (115, 120-1 to 120-*n*) maintains an up-to-date entry for the configuration version indicator of the access point (205).

Figure 3:
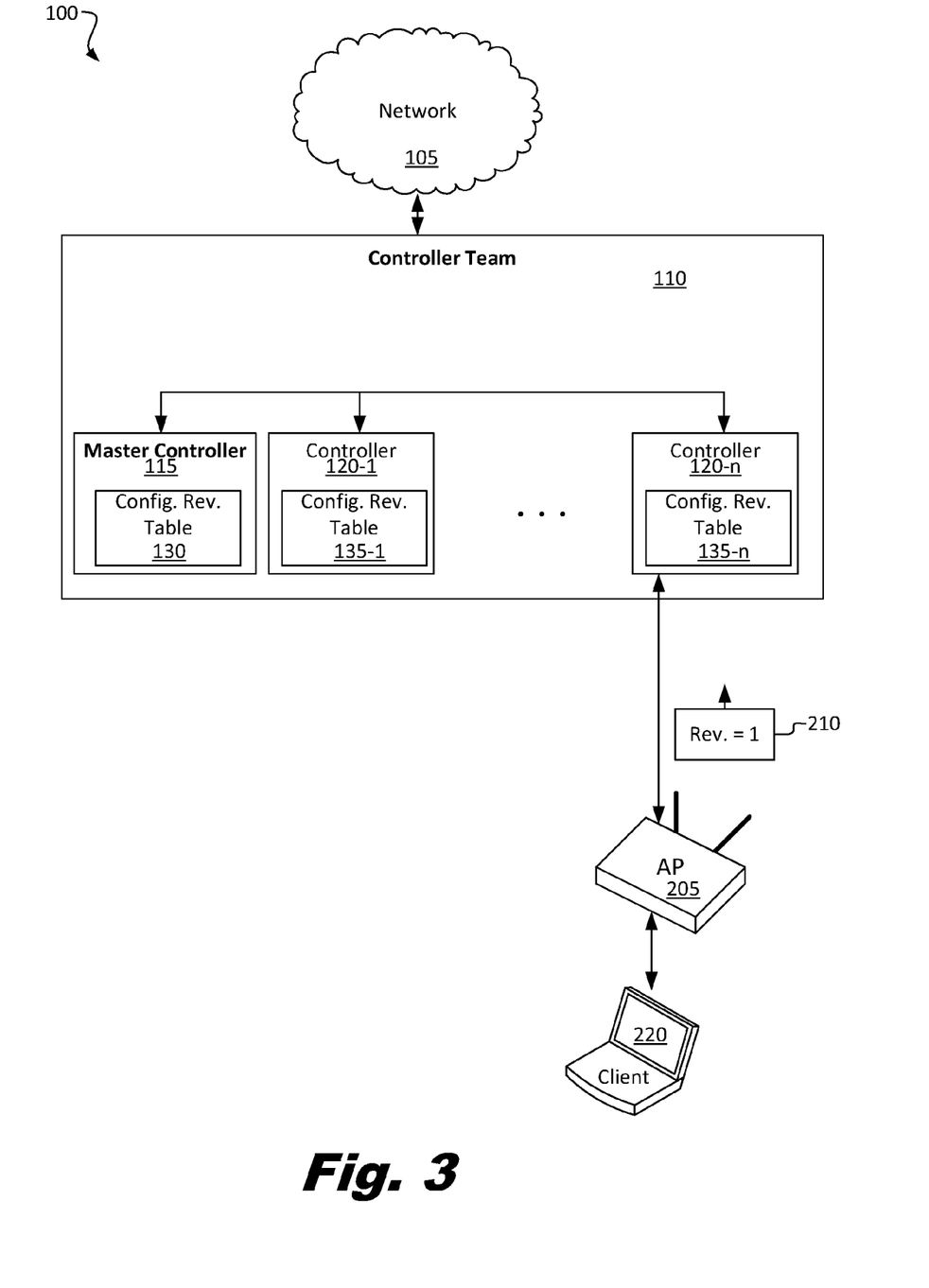
FIG. 3 is a block diagram of an illustrative system for allowing a client to access a network, according to one example of principles described herein.

FIG. 3 shows the migration of access point (205) of FIG. 2 from the first access point controller (120-1) to a new access point controller (120-*n*). This migration may occur, for example, if the first access point controller (120-1) becomes disconnected from the network or malfunctions. In such cases, the access point (205) may search the network for a new access point controller (115, 120-1 to 120-*n*) in the team (110) to control the access point (205). Upon discovering the new access point controller (120-*n*), the access point (205) may attempt to connect to the new access point controller (120-*n*).

In some systems, if a previously configured access point (205) establishes connectivity with a new access point controller (120-*n*), the new access point controller (120-*n*) may treat the access point (205) as a new access point (205) and reconfigure the access point (205). However, reconfiguring an access point (205) often resetting the access point configuration to a known factory default state and rebooting the access point (205) to execute the new machine-readable code. These operations may suspend the ability of the access point (205) to connect client devices (220) to the network (105) for a significant amount of time, which may cause undesirable network outages for certain client devices (220).

The system of the present specification overcomes these problems by informing each access point controller (115, 120-1 to 120-*n*) in the team of the most recent configuration revision indicator provided to each access point (205) by an access point controller (115, 120-1 to 120-*n*) in the team. Thus, as shown in FIG. 3, when the access point (205) that was previously configured by the first access point controller (120-1) connects to the new access point controller (120-*n*), the new access point controller (120-*n*) may query the access point (205) as to its current configuration revision indicator. In response, the access point (205) may transmit the value (305) assigned to its configuration revision indicator by the first access point controller (120-1).

The new access point controller (120-*n*) may then compare the current configuration revision indicator value (305) to the value for the current configuration revision indicator of the access point (205) stored in the configuration revision table (135-*n*) of the new access point controller (120-*n*). If the values match, the new access point controller (120-*n*) may determine that the access point (205) already has the latest configuration provided by the master controller (115). Consequently, the new access point controller (120-*n*) may permit the access point (205) to immediately resume providing network services to client devices (220) without reconfiguring the access point (205). If the values do not match, the new access point controller (120-*n*) may determine that the access point (205) does not have the most recent configuration provided by the master controller (115), and may reconfigure the access point (205) prior to allowing the access point (205) to provide network services to the client devices (220).

Figure 4:
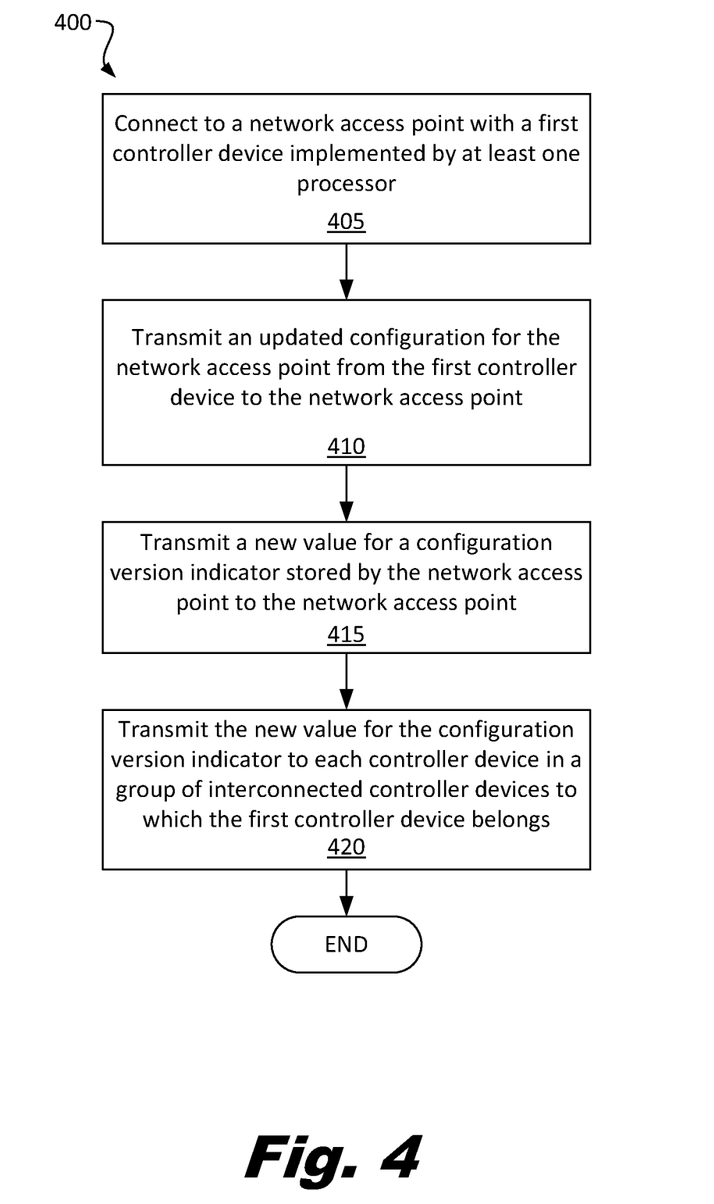
FIG. 4 is a flow diagram of an illustrative method of network access point management, according to one example of principles described herein.

FIG. 4 is a flow diagram of an illustrative method (400) of managing network access points according to the principles of the present specification. The method (400) may be performed by, for example, by an access point controller (115, 120-1 to 120-*n*) in a team (110) similar to that shown in FIGS. 1-3.

In the method (400), a first controller device implemented by at least one processor connects (block 405) to a network access point. The first controller device then transmits (block 410) an updated configuration for the network access point to the network access point.

This transmission (block 410) of the updated configuration may occur in response to the first controller device determining that a configuration of the network access point is out-of-date, incorrect, or unobtainable. In some examples, the first controller device may have received the updated configuration from a master controller device in a group of controller devices to which the first controller device belongs. Additionally, the first controller device transmits (block 415) a new value for a configuration version indicator stored by the network access point to the network access point, which stores the new value as its configuration version indicator.

In conjunction with the reconfiguration (block 410) of the access point, the first controller device transmits (block 420) the new value for the configuration version indicator to each controller device in a group of interconnected controller devices to which the first controller device belongs. The first controller device may be configured to communicate with the group of interconnected controller devices using any tunneling protocol that may suit a particular application of the principles described herein.

The controller devices receiving the new value from the first controller device may each maintain a table of configuration revision values for access points managed by the group of interconnected controller devices. Accordingly, each of the controller devices receiving the new value from the first controller device may update its respective table to record that the access point has been assigned the new configuration revision value. Furthermore, the first controller device may update its own configuration revision table to record the assignment of the new configuration revision value to the access point.

Figure 5:
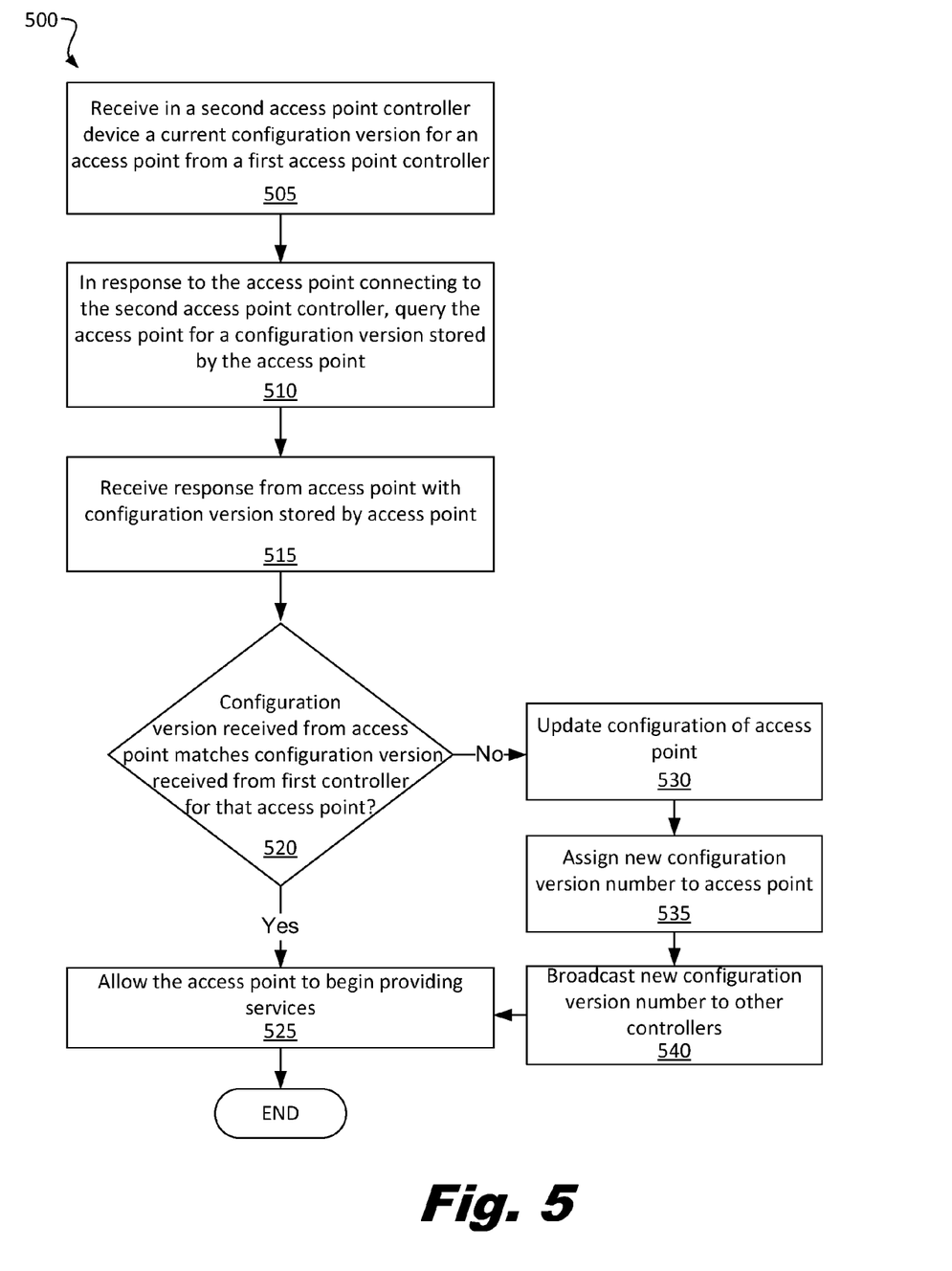
FIG. 5 is a flow diagram of an illustrative method of network access point management, according to one example of principles described herein.

FIG. 5 is a flow diagram of another method (500) of managing network access points. The method (500) may be performed in a team of interconnected access point controllers. In the method (500), a second access point controller device receives (block 505) a current configuration version for an access point from a first access point controller. The first and second access point controllers may communicate with each other using, for example, a a tunneling protocol. The second access point controller may store the current configuration version for the access point, as received from the first access point controller, in a configuration version table maintained by the second access point controller.

In response to that same access point connecting to the second access point controller, the second access point controller queries (block 510) the access point for a current configuration version stored by the access point and receives (block 515) a response from the access point with the current configuration version stored by the access point. The second access point controller then determines (block 520) whether the current configuration version received from the access point matches the configuration version received from the first access point controller for that access point. If the configuration versions match (block 520, YES), the second access point controller allows (block 525) the access point to begin providing network services to client devices immediately.

If the configuration versions do not match (block 520, NO), the second access point controller updates (block 530) the configuration of the access point. The access point may be prevented from providing network services to client devices until the configuration has been updated. The updated configuration for the access point may have been received by the second access point controller previously from a master access point controller using, for example, a tunneling protocol. The second access point controller also assigns (block 535) the access point a new configuration version number, stores the new configuration version number in its own records, and broadcasts (block 540) the new configuration version number for the access point to other controllers in a group of controllers to which the first and second access point controllers belong. This broadcast may also be made using a tunneling protocol. Once the access point has been reconfigured, the second access point controller may then permit (block 525) the access point to begin providing network services to client devices.

Figure 6:
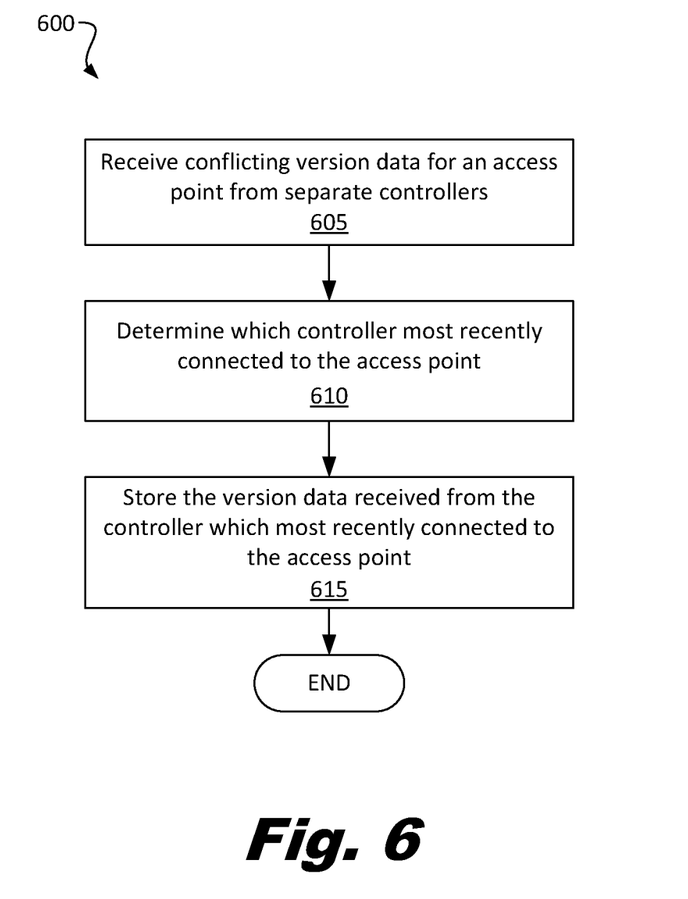
FIG. 6 is a flow diagram of an illustrative method of network access point management, according to one example of principles described herein.

FIG. 6 is a flow diagram of an illustrative method (600) that may be performed when two access point controllers in a team claim ownership of an access point. For example, if communication between an access point and a first access point controller fails, the access point may disconnect from the first access point controller and connect to a second access point controller. However, in some cases the first access point controller may not have yet timed out its connection with the access point, and therefore may not be aware that management of the access point has transferred to the second access point controller. In such cases, other access points in a team of access points may receive (block 605) conflicting configuration version data for the access point from the first access point controller and the second access point controller.

In the method (600) of FIG. 6, when conflicting configuration version data is received (block 605) from separate access point controllers, the controller receiving the conflicting data may determine (block 610) which of the transmitting access point controllers has most recently connected to the access point. In some examples, whenever an access point controller reconfigures an access point, the access point controller will include the amount of time it has been connected to the access point with its transmission of the configuration version data transmitted. Thus, by examining these time values associated with the conflicting data received, it can be determined which access point controller most recently connected to the access point. Once the identity of the access point controller which has most recently connected to the access point is known, the configuration version data received from that controller is stored (step 615) by the receiving access point controller.

Figure 7:
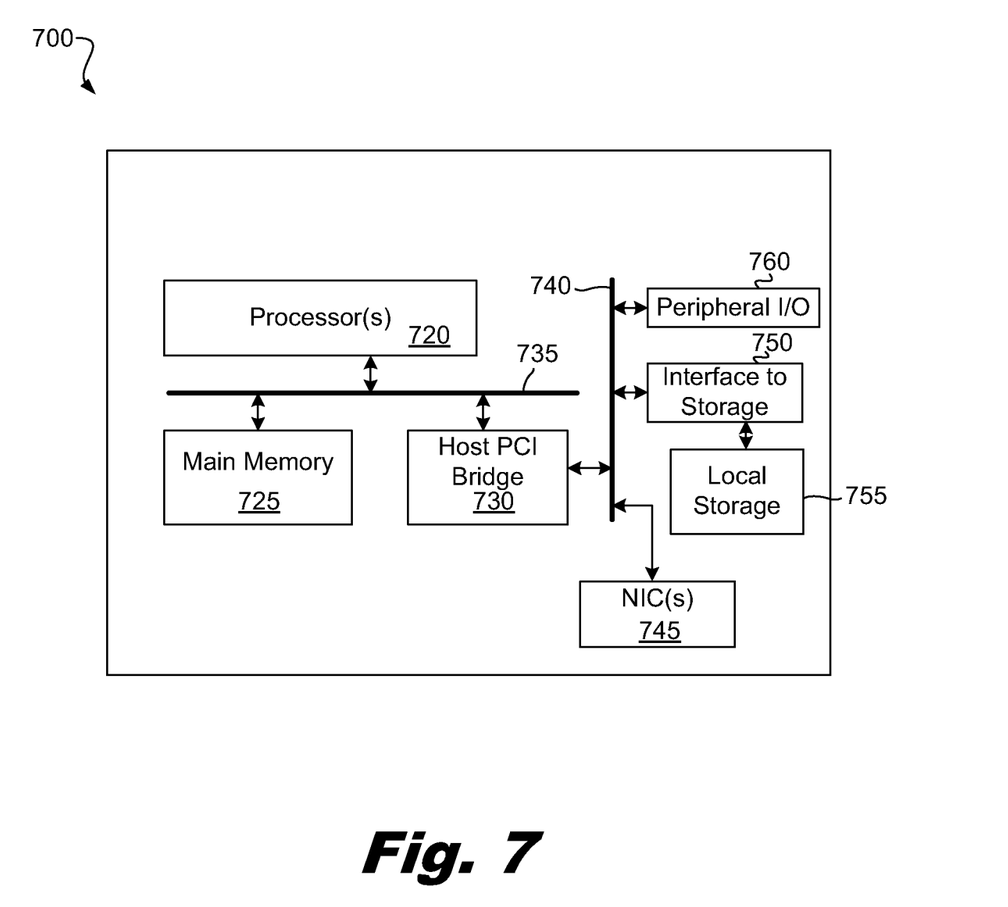
FIG. 7 is a block diagram of an illustrative network device, according to one example of principles described herein.

FIG. 7 is a block diagram of an illustrative network device (705). The illustrative network device (705) may implement an access point, an access point controller, a client device, and/or any other network device to perform the functionality described in relation to the previous Figures.

In this illustrative device (705), an underlying hardware platform executes machine-readable instructions to exhibit a desired functionality. For example, if the illustrative device (705) is configured to implement an access point controller, the machine-readable instructions may include at least instructions connecting to a network access point, transmitting an updated configuration for the network access point to the network access point, transmitting a new value for a configuration version indicator stored by the network access point, and transmitting the new value for the configuration version indicator stored by the network access point to the network access point.

The hardware platform of the illustrative device (705) may include at least one processor (720) that executes code stored in the main memory (725). In certain examples, the processor (720) may include at least one multi-core processor having multiple independent central processing units (CPUs), with each CPU having its own L1 cache and all CPUs sharing a common bus interface and L2 cache. Additionally or alternatively, the processor (720) may include at least one single-core processor.

The at least one processor (720) may be communicatively coupled to the main memory (725) of the hardware platform and a host peripheral component interface bridge (PCI) (730) through a main bus (735). The main memory (725) may include dynamic non-volatile memory, such as random access memory (RAM). The main memory (725) may store executable code and data that obtainable by the processor (720) through the main bus (735).

The host PCI bridge (730) may act as an interface between the main bus (735) and a peripheral bus (740) used to communicate with peripheral devices. Among these peripheral devices may be one or more network interface controllers (745) that communicate with one or more networks, an interface (750) for communicating with local storage devices (755), and other peripheral input/output device interfaces (760).

The configuration of the hardware platform of the network device (705) in the present example is merely illustrative of one type of hardware platform that may be used in connection with the principles described in the present specification. Various modifications, additions, and deletions to the hardware platform may be made while still implementing the principles described in the present specification.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of network access point management, said method comprising:
   connecting to a network access point with a first controller device implemented by at least one processor;
   transmitting an updated configuration for said network access point from said first controller device to said network access point;
   transmitting a new value for a configuration version indicator to be stored at said network access point from the first controller device to said network access point;
   transmitting an identifier of the network access point and said new value for said configuration version indicator for the network access point from said first controller device to each of other controller devices in a group of interconnected controller devices to which said first controller device belongs;
   receiving, by the first controller device, from the other controller devices in the group, identifiers of network access points controlled by the other controller devices, time values indicating amounts of time the network access points have been connected to the other controller devices, and configuration version values of configurations implemented at the network access points;
   when the first controller device receives conflicting configuration version values for a second network access point, determining, by the first controller device, which of the other controller devices is most recently connected to the second network access point by examining the time values associated with the conflicting configuration version values; and
   storing the configuration version value received from the controller device which is most recently connected to the second network access point.

2. The method of claim 1, further comprising maintaining, in the first controller device, a table of the identifiers and configuration version values of configurations implemented at the network access points controlled by the first controller device and the other controller devices in the group of interconnected controller devices.

3. The method of claim 1, wherein transmitting the updated configuration further comprises transmitting, by said first controller device, said updated configuration to said network access point in response to a determination that a present configuration of said network access point is out of date.

4. The method of claim 1, further comprising receiving by said first controller device said updated configuration for said network access point from a master controller device.

5. The method of claim 4, wherein said first controller device communicates with said master controller device and each said controller device in said group of controller devices using a tunneling protocol.

6. A method of network access point management, said method comprising:
- in a second controller device implemented by at least one processor, receiving from a first controller device an identifier of a first network access point controlled by the first controller device and a configuration version value assigned to the first network access point by said first controller device, said first controller device and said second controller device belonging to a group of controller devices;
- transmitting, from the second controller device to the first controller device, identifiers of network access points controlled by the second controller device and configuration version values of configurations implemented at the network access points;
- in response to said first network access point connecting to said second controller device, querying said first network access point with said second controller device for a configuration version value stored by said first network access point;
- receiving in said second controller device said configuration version value stored by said first network access point from said first network access point;
- with said second controller device, allowing said network access point to begin providing network access point services if said configuration version value received from said first network access point matches said configuration version value received from said first controller device;
- if said configuration version value received from said first network access point does not match said configuration version value received from said first controller device, transmitting a new configuration version number from said second controller device to said first network access point; and
- transmitting the identifier of the first network access point and the new configuration version number for the first network access point from the second controller device to other controller devices belonging to the group of controller devices;
- receiving, by the second controller device, from other controller devices in the group, identifiers of network access points controlled by the other controller devices, time values indicating amounts of time the network access points have been connected to the other controller devices, and configuration version values of configurations implemented at the network access points;
- when receiving conflicting configuration version values for a second network access point, determining, by the second controller device, which of the other controller devices is most recently connected to the second network access point by examining the time values associated with the conflicting configuration version values; and
- storing the configuration version value received from the controller device which is most recently connected to the second network access point.

7. The method of claim 6, further comprising:
updating a configuration of said first network access point with said second controller device if said configuration version value received from said network access point does not match said configuration version value received from said first controller device.

8. The method of claim 7,
wherein transmitting said new configuration version number from said second controller device to said first network access point is in response to updating said configuration of said network access point with said second controller device.

9. The method of claim 6, further comprising, if said configuration version value received from said first network access point does not match said configuration version value received from said first controller device, preventing said first network access point from providing network access services until a configuration of said first network access point has been updated.

10. The method of claim 6, further comprising maintaining a table in said second controller device of identifiers and configuration version values of configurations implemented at the network access points controlled by the second controller device and the other controller devices in the group of controller devices.

11. The method of claim 6, further comprising receiving with said second controller device said updated configuration for said first network access point from a master controller device.

12. The method of claim 11, wherein said second controller device communicates with said master controller device and each of said other controller devices in said group of controller devices using a tunneling protocol.

13. A controller device, comprising:
a processor communicatively coupled to a memory, said memory storing executable code that, when executed by said processor, causes said processor to:
connect to a network access point;
transmit an updated configuration for said network access point to said network access point;
transmit a new value for a configuration version value to be stored at said network access point to said network access point;
transmit an identifier of the network access point and said new value for said configuration version value for the network access point to a plurality of peer controller devices in a group to which said controller device belongs;
receive, from the plurality of peer controller devices, identifiers of network access points controlled by the plurality of peer controller devices, time values indicating amounts of time the network access points have been connected to the peer controller devices, and configuration version values of configurations implemented at the network access points;
when receiving conflicting configuration version values for a second network access point, determine which of the peer controller devices is most recently connected to the second network access point by examining the time values associated with the conflicting configuration version values; and
store the configuration version value received from the peer controller device which is most recently connected to the second network access point.

14. The controller device of claim 13, said executable code further causing said processor to maintain a table of the identifiers and configuration version values of the network access points controlled by the controller device and the plurality of peer controller devices in said group.

15. The controller device of claim 13, said executable code further causing said processor to transmit said updated configuration for said network access point to said network access point in response to a determination that a present configuration of said network access point is out of date.

* * * * *